United States Patent [19]

Dame

[11] Patent Number: 5,620,032
[45] Date of Patent: Apr. 15, 1997

[54] GAS NOZZLE VALVE

[76] Inventor: Curtis E. Dame, 3268 Saint Anthony Dr., Portage, Mich. 49081

[21] Appl. No.: 420,345

[22] Filed: Apr. 11, 1995

[51] Int. Cl.$^6$ .............................. B65B 1/04; B65B 3/04; B67C 3/00
[52] U.S. Cl. ...................... 141/311 A; 141/192; 137/847; 137/855; 222/108; 239/120; 239/571
[58] Field of Search ..................................... 141/192, 206, 141/207, 208, 209, 115, 311 A; 137/846, 847, 855; 251/61, 149.8, 155, 175, 176; 222/108; 239/571, 120, 104

[56] References Cited

U.S. PATENT DOCUMENTS

| 2,446,571 | 8/1948 | Browne | 137/847 |
|---|---|---|---|
| 3,923,425 | 12/1975 | Porter et al. | 417/298 |
| 4,213,488 | 7/1980 | Pyle | 141/1 |
| 4,556,093 | 12/1985 | Jones | 141/206 |
| 4,846,836 | 7/1989 | Reich | 623/11 |
| 5,377,729 | 1/1995 | Reep | 141/392 |

FOREIGN PATENT DOCUMENTS

| 228306 | 2/1925 | United Kingdom . |
|---|---|---|
| 1027271 | 4/1966 | United Kingdom . |

Primary Examiner—David J. Walczak
Assistant Examiner—Timothy L. Maust
Attorney, Agent, or Firm—Richard C. Litman

[57] ABSTRACT

An improved non-drip nozzle valve which can be retro-fitted onto existing fuel dispensing nozzles comprises an expanding integral wire frame made from two spaced, interconnected C-shaped springs. Once inserted into the throat of the fuel dispensing nozzle, the C-shaped springs expand the frame to engage the inner wall of the nozzle. Each C-shaped portion of the frame is provided with a rubber flap valve half. The two halves of the flap valve overlap each other when the fuel flow is discontinued to prevent any remaining fuel from dripping or spilling out of the end of the nozzle. When the fuel is being pumped, the flow pressure is great enough to unseat the flap valve halves allowing fuel to freely flow past the valve.

7 Claims, 3 Drawing Sheets

5,620,032

GAS NOZZLE VALVE

BACKGROUND OF THE INVENTION

1. Field of the Invention

The present invention relates to a check valve for a fuel pump nozzle.

2. Description of the Prior Art

A common complaint among commuters and pleasure travelers alike is the tendency for gas station fuel pump nozzles to leak fuel after the nozzle has been removed from the fuel filler port of an automobile. Even with the addition of vapor trapping collars on the fuel nozzles which prevent fuel vapors from entering the surrounding air, the nozzles still drip fuel when the nozzle is removed. Consequently, several attempts have been made in the past to prevent pumps from dripping fuel after the flow of liquid has been stopped, but there has been little success, prior to the present invention.

U.S. Pat. No. 3,923,425 issued to David L. Porter et al. on Dec. 2, 1975, shows a fuel pump shut-off valve installed on an automobile. The fuel pump valve uses positive pressure across a diaphragm member to force an inlet/shut-off valve into a closed position.

U.S. Pat. No. 4,846,836 issued to Jonathan D. Reich on Jul. 11, 1989, shows a bi-directional valve which can be inserted into the gastroesophageal sphincter to provide a pressure differential artificial valve.

U.S. Pat. No. 5,377,729 issued to Alan J. Reep on Jan. 3, 1995, shows a spring-biased plug member mounted at the end of a fuel nozzle which prevents liquid such as gasoline from dripping or escaping out the dispensing end of the nozzle when liquid is not being dispensed through the nozzle.

British Patent No. 228,306 issued to Leslie Bernard Williams on Feb. 5, 1925, shows a fuel pump nozzle with a spring-biased, central poppet valve placed at the end of a fuel nozzle to prevent fuel from dripping after the main flow has stopped.

British Patent No. 1,027,271 to Cecil Duckworth et al. published on Apr. 27, 1966, shows a mechanically operated poppet valve centrally located within a fuel dispensing nozzle. Side protruding tabs are displaced by the throat of the fuel filler pipe during insertion of the fuel nozzle into the automobile to allow the central poppet valve to become unseated under fuel flow pressure allowing fuel to flow past the nozzle. When the fuel flow is terminated, the poppet valve reseats and seals the nozzle against drippage.

None of the above inventions and patents, taken either singly or in combination, is seen to describe the instant invention as claimed.

SUMMARY OF THE INVENTION

The present invention is an improved non-drip nozzle valve which can be retro-fitted onto existing fuel dispensing nozzles. The valve has an expanding integral wire frame made from two axially spaced, interconnected C-clip springs. Once inserted into the throat of the fuel dispensing nozzle, the C-clip springs expand the frame to engage the inner wall of the nozzle. Each C-clip spring in the frame is provided with a rubber flap valve portion. The two portions of the flap valve overlap each other when the fuel flow is discontinued to prevent any remaining fuel from dripping or spilling out of the end of the nozzle. When fuel is being pumped, the flow pressure is great enough to unseat the flap valve portions allowing fuel to freely flow past the valve.

Accordingly, it is a principal object of the invention to provide an enhanced anti-drip valve which can be inserted into an end of a fuel nozzle.

It is another object of the invention to provide an anti-drip valve which is self-seating within the throat of an existing fuel dispensing nozzle.

It is a further object of the invention to provide a flap type valve which can be inserted into the end of a fuel dispensing nozzle to prevent the unintentional release of fuel into the environment.

Still another object of the invention is to provide a flap type valve mounted to an expandable wire frame which can be inserted or removed from a fuel dispensing nozzle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
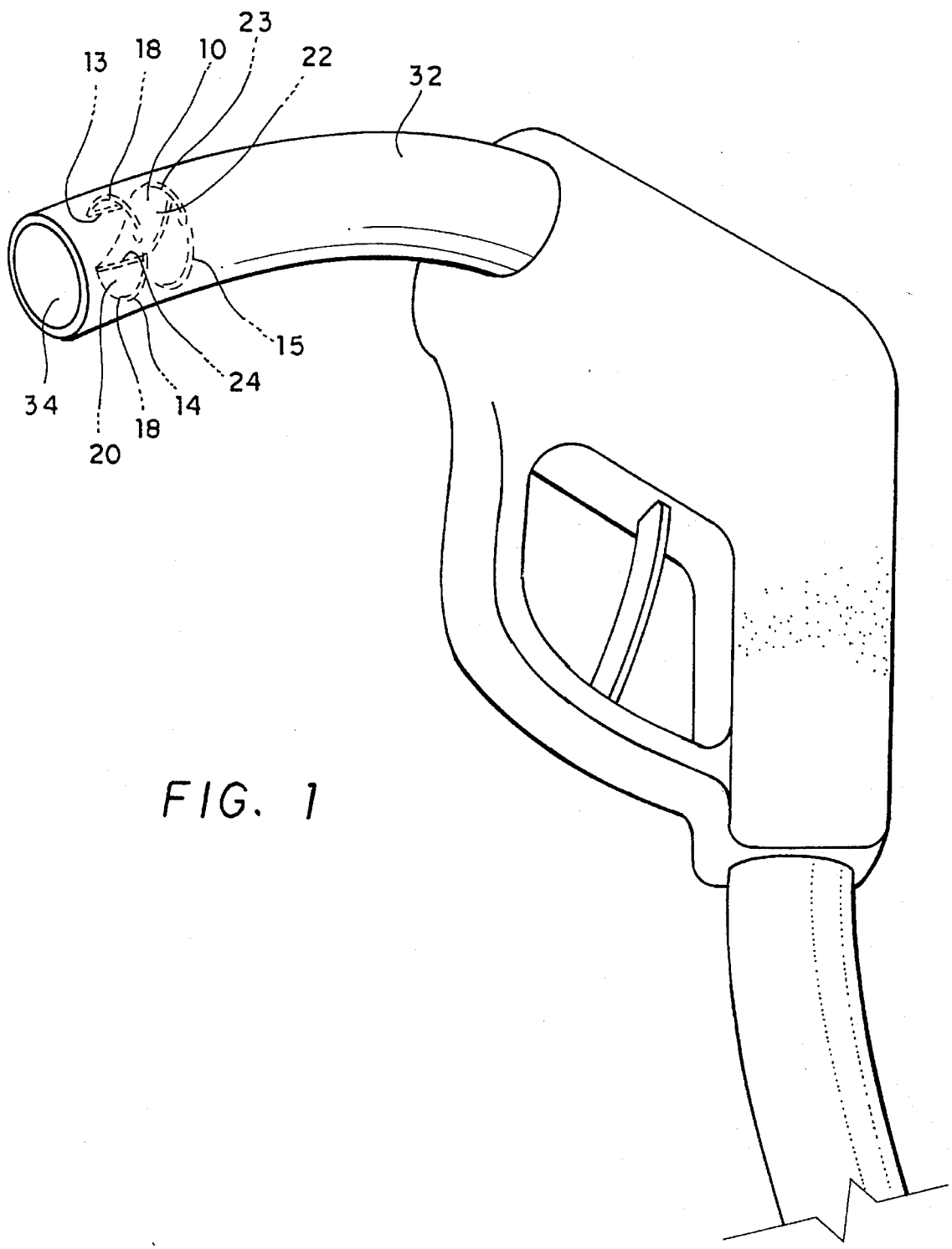
FIG. 1 is a perspective view of a fuel nozzle with a valve according to the present invention installed in the throat of a fuel nozzle.
Figure 2:
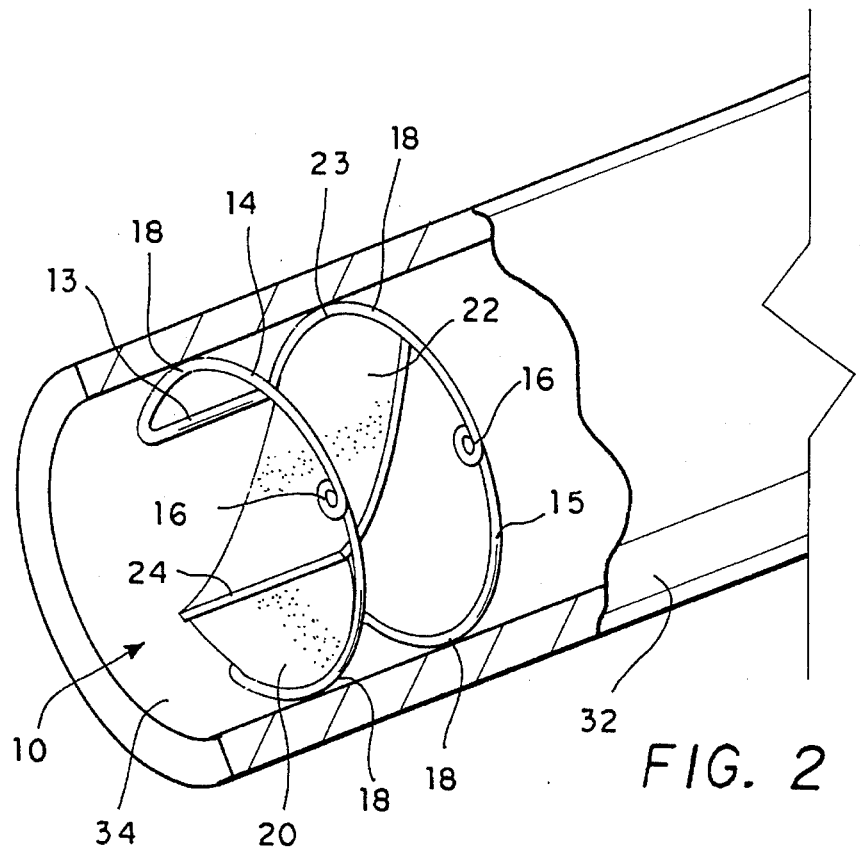
FIG. 2 is a breakaway, expanded view of the throat of a fuel nozzle housing a valve according to the present invention with the valve shown in the closed, sealed position.
Figure 3:
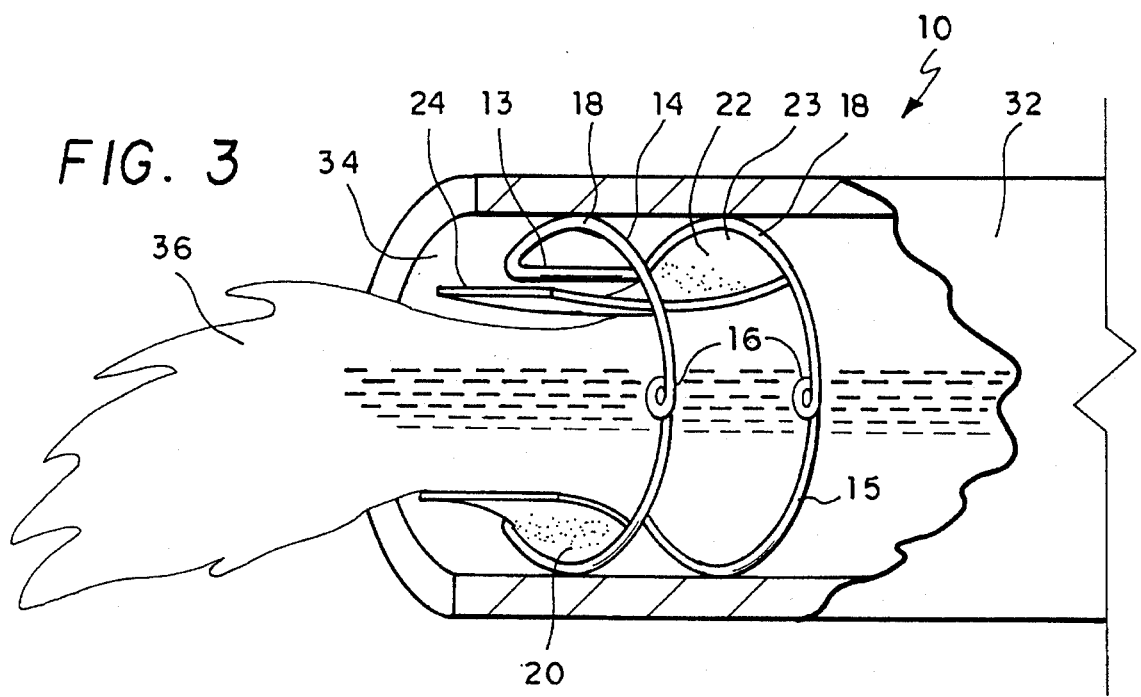
FIG. 3 is a breakaway, expanded view of the throat of a fuel nozzle housing a valve according to the present invention with the valve shown in the open position.
Figure 4:
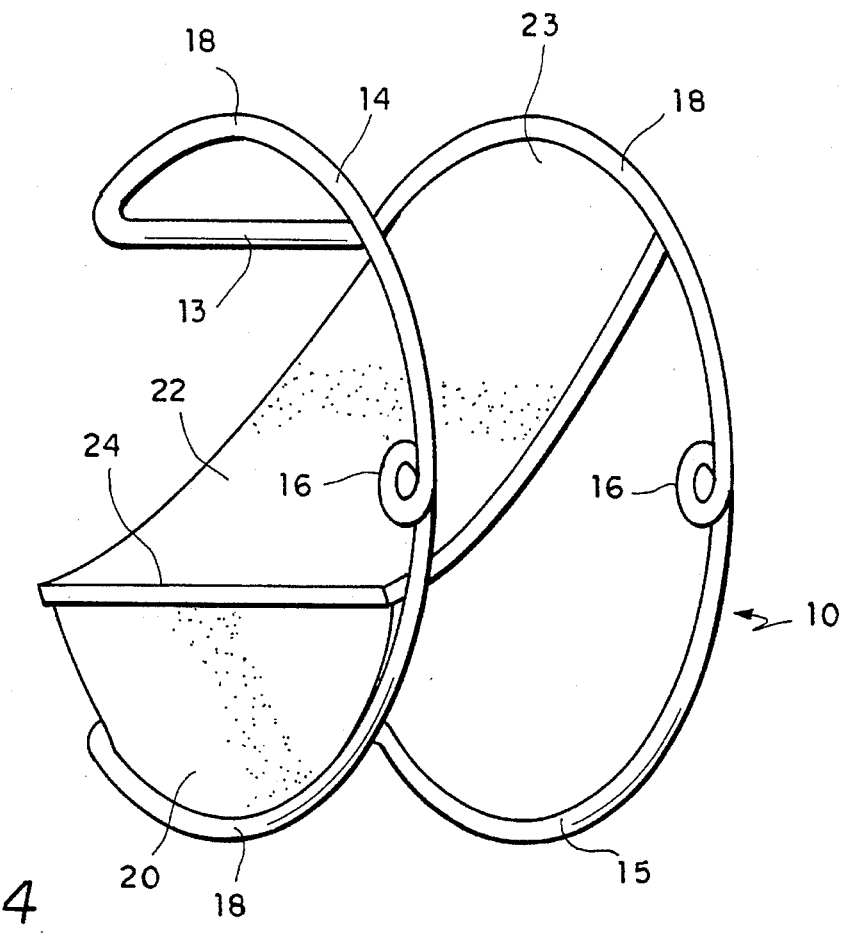
FIG. 4 is a perspective view of the flaps and frame of the valve according to the present invention.
Figure 5:
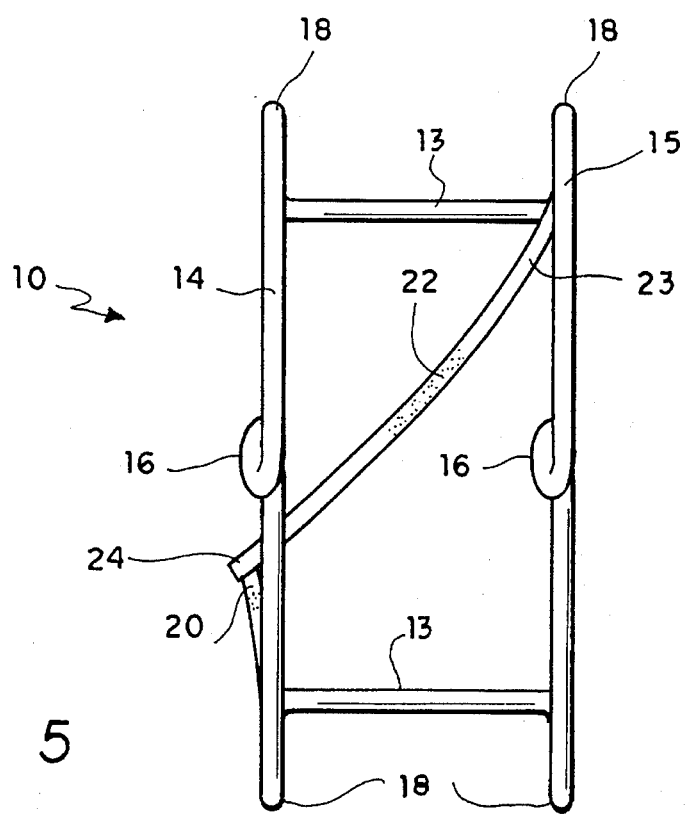
FIG. 5 is a side elevational view of the valve according to the present invention.

A frequently encountered inconvenience among motorists is the drippy fuel nozzle. These drippy fuel nozzles leave countless hands smelling of gas. Not only is this circumstance offensive to most motorists, but it is also potentially harmful, insofar as gasoline is an environmental hazard. The present invention is provides a solution to this problem in the form of an improved non-drip nozzle valve which can be retro-fitted onto existing fuel dispensing nozzles, thereby putting an end to drippy nozzles.

Referring to the drawings, the valve 10 of the present invention is comprised by two parallel, C-shaped springs 14, 15, including a forward spring 14 and a rear spring 15, separated from one another and oriented perpendicularly to a longitudinal axis of a fuel dispensing nozzle 32. The springs 14, 15 have spring-loop elements 16 and are interconnected by elongated rod-like interconnection members 13. The springs 14, 15 are composed of a resilient material such as spring steel. The springs 14, 15 define a truncated cylinder, a diameter of which can be compressed by application of pressure to sides 18 of the springs 14, 15. During such compression, the spring-loop elements 16 flex into a larger configuration without increasing the overall width of the valve. In this way, the valve can be compressed in one direction without concomitant increase of size in any other direction, thereby enabling insertion of the valve within the nozzle 32 that may be somewhat smaller in inner diameter than the uncompressed valve.

Each C-shaped spring 14, 15 of the valve 10 is provided with rubber flap valve portions 20, 22, including a forward valve portion 20 and a rear valve portion 22. The forward valve portion 20 has a semi-lunar shape. When not subject to stress, the forward valve portion 20 lies within a plane defined by a forward spring 14. The rear valve portion 22 has a nearly rectangular shape, with one side 23 being curved. When not subject to stress, the rear valve portion 22 is juxtaposed at a flat side 24 with the forward valve portion 20. The curved side 23 is attached to a rear spring 15.

In use, the valve 10 is inserted into the fuel dispensing nozzle 32, by pressing the C-shaped springs 14, 15 together, and then allowing them to expand within the nozzle 32 to frictionally engage an inner wall 34 of the nozzle 32. When fuel 36 is pumped at a fuel pump's typical pressure through the nozzle 32, the pressure of the fuel 36 unseats the flap valve portions 20, 22 disposed on the C-shaped springs 14, 15, respectively, allowing fuel 36 to freely flow past the valve 10. The valve portions 20, 22 of the valve 10 overlap each other when the fuel pressure is diminished to a negligible level or eliminated altogether, thereby preventing any remaining fuel 36 from dripping or spilling out of the nozzle 32. In this way, the valve portions 20, 22 obstruct passage of fluid, such as fuel 36, having less than a first predetermined level of pressure and to allow passage of fluid having greater than a second, higher predetermined level of pressure.

Because of the small size of the valve 10, and because it is so easy to install, the valve 10 conveniently solves the problem of fuel 36 dripping from a conventional fuel nozzle 32; yet the valve 10 does not obstruct normal, desired fuel flow.

It is to be understood that the present invention is not limited to the sole embodiment described above, but encompasses any and all embodiments within the scope of the following claims.

I claim:

1. A valve for a fuel nozzle comprising:

two C-shaped springs dimensioned and configured to frictionally engage an inner surface of a fuel nozzle, said C-shaped springs including a forward spring and a rear spring oriented in parallel and attached to one another by means for attachment; and valve portions attached to said springs and disposed between said springs.

2. The valve according to claim 1, wherein said valve portions are dimensioned and configured to obstruct passage of fluid having less than a first predetermined level of pressure and to allow passage of fluid having greater than a second, higher predetermined level of pressure.

3. The valve according to claim 1, wherein one of said valve portions is disposed on said forward spring and another of said valve portions is disposed on said rear spring.

4. The valve according to claim 3, wherein said valve portion disposed on said forward spring has a semi-lunar shape and said valve portion disposed on said rear spring has a nearly rectangular shape with one edge being curved.

5. The valve according to claim 1, wherein said means for attachment comprises interconnection members connecting said springs.

6. The valve according to claim 6, wherein said interconnection members are elongated rod-like members.

7. The valve according to claim 1, wherein said springs have spring-loop elements that flex when said springs are compressed, without increasing an over-all width of said springs.

* * * * *